US007363343B2

(12) United States Patent
Bucher

(10) Patent No.: US 7,363,343 B2
(45) Date of Patent: Apr. 22, 2008

(54) COMPUTER NETWORKS FOR PROVIDING PEER TO PEER REMOTE DATA STORAGE AND COLLABORATION

(75) Inventor: Tim Bucher, Los Altos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 55 days.

(21) Appl. No.: 11/032,359

(22) Filed: Jan. 10, 2005

(65) Prior Publication Data

US 2005/0125536 A1  Jun. 9, 2005

Related U.S. Application Data

(62) Division of application No. 10/227,328, filed on Aug. 23, 2002, now Pat. No. 6,928,476.

(51) Int. Cl.
  *G06F 15/16* (2006.01)
  *G06F 15/173* (2006.01)
  *H04L 9/32* (2006.01)
(52) U.S. Cl. ........................... 709/205; 709/225
(58) Field of Classification Search ................. 709/226
  See application file for complete search history.

(56) References Cited

U.S. PATENT DOCUMENTS

| 5,550,976 | A | 8/1996 | Henderson et al. |
| 5,586,260 | A | 12/1996 | Hu |
| 5,799,323 | A | 8/1998 | Mosher, Jr. et al. |
| 5,931,947 | A | 8/1999 | Burns et al. |
| 5,960,404 | A | 9/1999 | Chaar et al. |
| 6,052,797 | A | 4/2000 | Ofek et al. |
| 6,209,002 | B1 | 3/2001 | Gagne et al. |
| 6,247,046 | B1 | 6/2001 | Yanai et al. |
| 6,253,253 | B1 | 6/2001 | Mason et al. |
| 6,269,382 | B1 | 7/2001 | Cabrera et al. |

(Continued)

FOREIGN PATENT DOCUMENTS

WO   2002065329 WO   8/2002

OTHER PUBLICATIONS

U.S. Appl. No. 11/032,366, filed Jan. 10, 2005, Tim Bucher.

(Continued)

*Primary Examiner*—Andrew Caldwell
*Assistant Examiner*—Douglas Blair
(74) *Attorney, Agent, or Firm*—David K. Lucente

(57) ABSTRACT

Computer networks for brokering the transmission of data between remote computers for purposes of redundancy or collaboration. A service brokers the transfer of data between an initiating computer and a destination device, thereby establishing a peer-to-peer architecture by which data of the initiating computer can be stored remotely on the destination device. The process begins as the initiating computer issues a request for permission to store the data remotely on an identified destination device. The permission is granted if the initiating computer properly identifies the destination device using information, such as a network address or a password, that is privately communicated between the users of the destination device and the initiating computer. Accordingly, substantially any computer user having access to the Internet can achieve remote backup of data and remote collaboration of data with the assistance of a trusted third party who also is registered with the service.

10 Claims, 6 Drawing Sheets

U.S. PATENT DOCUMENTS

| | | | |
|---|---|---|---|
| 6,311,232 B1* | 10/2001 | Cagle et al. | 710/8 |
| 6,442,709 B1* | 8/2002 | Beal et al. | 714/33 |
| 6,507,875 B1 | 1/2003 | Mellen-Garnett et al. | |
| 6,543,004 B1* | 4/2003 | Cagle et al. | 714/15 |
| 6,748,447 B1 | 6/2004 | Basani et al. | |
| 6,832,242 B2 | 12/2004 | Keskar | |
| 6,834,192 B1* | 12/2004 | Watanabe et al. | 455/444 |
| 6,871,286 B1* | 3/2005 | Cagle et al. | 726/5 |
| 6,901,434 B1 | 5/2005 | Lunsford et al. | |
| 6,928,476 B2 | 8/2005 | Bucher | |
| 6,978,294 B1* | 12/2005 | Adams et al. | 709/217 |
| 7,010,576 B2 | 3/2006 | Bae | |
| 7,103,645 B2 | 9/2006 | Leighton et al. | |
| 7,133,933 B2 | 11/2006 | Shah et al. | |
| 7,181,523 B2 | 2/2007 | Sim | |
| 7,277,950 B1* | 10/2007 | Chapweske | 709/227 |
| 2002/0032489 A1 | 3/2002 | Dermot et al. | |
| 2002/0090934 A1 | 7/2002 | Mitchelmore | |
| 2002/0165920 A1 | 11/2002 | Keller-Tuberg | |
| 2003/0009518 A1* | 1/2003 | Harrow et al. | 709/203 |
| 2003/0009586 A1* | 1/2003 | Harrow et al. | 709/238 |
| 2003/0009587 A1* | 1/2003 | Harrow et al. | 709/238 |
| 2003/0018712 A1* | 1/2003 | Harrow et al. | 709/203 |
| 2003/0115251 A1* | 6/2003 | Fredrickson et al. | 709/201 |
| 2003/0120699 A1* | 6/2003 | Hostetter et al. | 709/101 |
| 2004/0019640 A1 | 1/2004 | Bartram et al. | |
| 2004/0139267 A1* | 7/2004 | Gillespie et al. | 710/306 |
| 2005/0149578 A1 | 7/2005 | Sustman et al. | |
| 2005/0185636 A1 | 8/2005 | Bucher | |
| 2002/0104022 A1 | 2/2006 | Jorgenson | |
| 2006/0026171 A1 | 2/2006 | Savage | |

OTHER PUBLICATIONS

Bentley, et al., The Architecture of the BSCW Shared Workspace System, Proceeding of the ERCIM Workshop on CSCW and the Web, Sank Augustin, Germany, Feb. 7-9, 1996. http://orgwis.fit.fraunhofer.de/projects/W4G/proceedings/bscw.html.

Non-Final Office Action: Restriction/Election Requirement in U.S. Appl. No. 10/227,328 dated Feb. 5, 2004, prepared by U.S. Patent and Trademark Office, 5 pages.

Response to Restriction Requirement in U.S. Appl. No. 10/227,328 dated Mar. 5, 2004, filed by Applicant with U.S. Patent and Trademark Office, 4 pages.

Non-Final Office Action in U.S. Appl. No. 10/277,328, dated May 13, 2004, prepared by U.S. Patent and Trademark Office, 5 pages.

Response to May 13, 2004 Office Action (Amendment A) in U.S. Appl. No. 10/277,328, dated Aug. 31, 2004, filed by Applicant with U.S. Patent and Trademark Office, 14 pages.

Non-Final Office Action in U.S. Appl. No. 11/178,131, dated Jun. 19, 2007, prepared by U.S. Patent and Trademark Office, 10 pages.

Response to Jun. 19, 2007 Non-Final Office Action, in U.S. Appl. No. 11/178,131, dated Oct. 19, 2007, filed by Applicant with U.S. Patent and Trademark Office, 12 pages.

Batten, et al., pStore: A Secure Peer-to-Peer Backup System (MIT-LCS-TM-632), Internet citation [online] Dec. 8, 2001, Retrieved Oct. 16, 2007 from URL: <http://www.cag.lcs.mit.edu/~Kbarr/pstore/pStore.pdf>, 12 pages.

International Search Report dated May 24, 2004, prepared by U.S. Patent and Trademark Office as International Searching Authority for international application PCT/US2003/025497, and published with International Publication No. WO 2004/019158 A3, 4 pages.

\* cited by examiner

COMPUTER NETWORKS FOR PROVIDING PEER TO PEER REMOTE DATA STORAGE AND COLLABORATION

CROSS-REFERENCE TO RELATED APPLICATIONS

This application is a divisional of U.S. patent application Ser. No. 10/227,328, filed Aug. 23, 2002 now U.S. Pat. No. 6,928,476, which is incorporated herein by reference.

BACKGROUND OF THE INVENTION

1. The Field of the Invention

This invention relates generally to the field of computer networking and data storage. In particular, embodiments of the present invention relate to a distributed data storage and sharing system.

2. The Relevant Technology

Computer and data communications networks continue to proliferate due to declining costs, increasing performance of computer and networking equipment, and increasing demand for communication bandwidth. Communications networks, including wide area networks ("WANs") and local area networks ("LANs"), allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has increased, network technology has grown to include many different physical configurations. Such networks utilize different cabling systems, different bandwidths and typically transmit data at different speeds. In addition, each of the different network types have different sets of standards, referred to as protocols, which set forth the rules for accessing the network and for communicating among the resources on the network. Historically, a majority of installed networks have been wire-based. That is, the interconnections between clients, servers, and peripherals are accomplished with wire and cable-based connection systems. Depending on the size and type of network involved, the cost can be significant and the installation, maintenance and upgrading of such networks can be complex and require sophisticated skills. Moreover, even the physical space needed for today's wire-based network systems can be prohibitive.

A key advantage of utilizing computer networks is the ability for individual computers and users to share various resources on the network. One important form of resource sharing is the ability to remotely store data from one computer or device onto a different computer or device. For example, a laptop or portable computer attached to the network could have the ability to store data on a large capacity data storage device that is also connected to the network. Remotely stored data can be used as a primary data source or as a redundant data source for reliability purposes. Because of frequent software and hardware failures, plus security breach issues, redundancy and reliability have become critical in current computer networks. Therefore, in order to properly "back up" and secure data, it should be encrypted and stored at a remote location.

Likewise, the ability to share data with various members of a computer network has also become important for allowing efficient methods of remote collaboration. Online or remote collaboration has become an important method of generating documents and reviewing existing documents. To facilitate this form of collaboration, a particular file or segment of data must be accessible by all of the participating parties. This can be done by either placing a copy of the file at each of the locations or providing all participants access to a single file. The former solution is more favorable in many WAN scenarios because it does not rely on a single piece of hardware and is not limited by bandwidth. For example, many existing services provide the ability to store data at a remote internet accessible location such that numerous parties can access the data and thereby collaborate. Unfortunately, the reliability of the Internet, the reliability of the service's hardware, and the limited bandwidth of the Internet limit the effective collaboration under this scheme. Therefore, for WAN applications, it is more desirable to store a copy of the file at the location of every participant involved in the collaboration.

Current networking software modules do not provide adequate mechanisms to allow for the dynamic storage of particular files or segments of data, whether for remote backup or collaboration purposes. Dynamic storage refers to storing a segment of data and automatically replacing the segment of data with a more current version at periodic intervals. Most existing network software modules allow users to manually transfer data from one location to another but do not update the data. If the purpose of the remote data storage is to provide reliability for the file, this is only achieved if the file is updated periodically so that additional data added to the original file after the initial transfer are not lost in the event the original file is lost. If the purpose of the remote data storage is to facilitate online or remote collaboration, it is vital that the copies of the document at each location be periodically updated so that each participant can see what each of the other participants are doing.

Most conventional systems that permit either remotely backing up data or sharing data with remote computers are expensive or require the specialized skills of a network administrator or an information technology professional. In spite of these costs and complexities, many business or enterprise networks have been able to use such systems. However, most users of computers in home and small offices and most users of computers for personal rather than business purposes have been unable to remotely back up data or conveniently share data with other remote users.

BRIEF SUMMARY OF EMBODIMENTS OF THE INVENTION

These and other problems in the prior art are addressed by embodiments of the present invention, which relates to a method of remotely storing data between computers or devices across a wide area network (WAN) for applications including redundancy and collaboration. Moreover, the method includes security features that are important for securing data transferred over large distances. The security features include encrypting all transfers of data between remotely located computers or devices, requiring specific identification of the destination computer device, and obtaining permission from the destination device before any data is transferred from the initiating device to the destination device. The method enables computers connected to a service to transfer dynamic copies of data to selected computers or devices that are also connected to the service. Dynamic copies will automatically be updated in response to predetermined criteria. All data communications between the computers or devices are brokered or routed by the service.

According to one aspect of the invention, the method for storing data at a remotely located device begins with an initiating computer identifying a remote device on which to store a segment of data. Both the remote device and the initiating computer are registered with a service. The remote device is a computer, a network appliance, or another computing device that has sufficient data storage capabilities. Next, the initiating computer receives permission to store the segment of data on the remote device. The act of receiving permission ensures that the initiating device is explicitly authorized to store data on a particular remote computer registered with the service instead of being able to store data secretly on any such remote computer. Finally, the initiating computer transfers the segment of data to the service. The service then brokers or transfers the segment of data to the remote device. The segment of data at the remote device is dynamically updated by periodically overwriting the existing segment of data with a newer version of the segment of data from the initiating computer.

This method overcomes the limitations of the prior art by facilitating the automatic updating of a particular copy of a segment of data that is transferred to a remote location. This method applies to scenarios that include remote backup of data and remote online collaboration (e.g., data editing or sharing) with respect to a segment of data. Both of these applications are more effective when the copy of data stored at the remote location is as up to date as possible.

In this manner, a computer user who is registered with the service can back up data in a remote location in a simple and cost-effective way. When data is remotely backed up according to the invention, the data is encrypted and stored on a data storage device owned and operated by a third party, who may be a trusted acquaintance of the user of the initiating computer or may be any other user who is also registered with the service. Thus, remote data storage for backup purposes can be obtained by substantially any computer user using this peer-to-peer model, including those of home or small offices or home personal computers. Similarly, the invention permits substantially any computer users with access to the Internet to establish virtual local area networks with remote users and to thereby engage in real time collaboration over a WAN with respect to data.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to a method of remotely storing data between computers or devices across a wide area network (WAN) for applications including redundancy and collaboration. Moreover, the method includes security features that are important for securing data transferred over large distances. The security features include encrypting all data transferred between the initiating computer and the remote device, requiring specific identification of the destination computer device and obtaining permission from the destination device before any data is transferred from the initiating device to the destination device. The method enables computers connected to a service to transfer dynamic copies of data to selected computers or devices that are also connected to the service. Dynamic copies are automatically updated in response to predetermined criteria. All data communications between the computers or devices are brokered or routed by the service.

I. Exemplary Network Architecture

Figure 1:
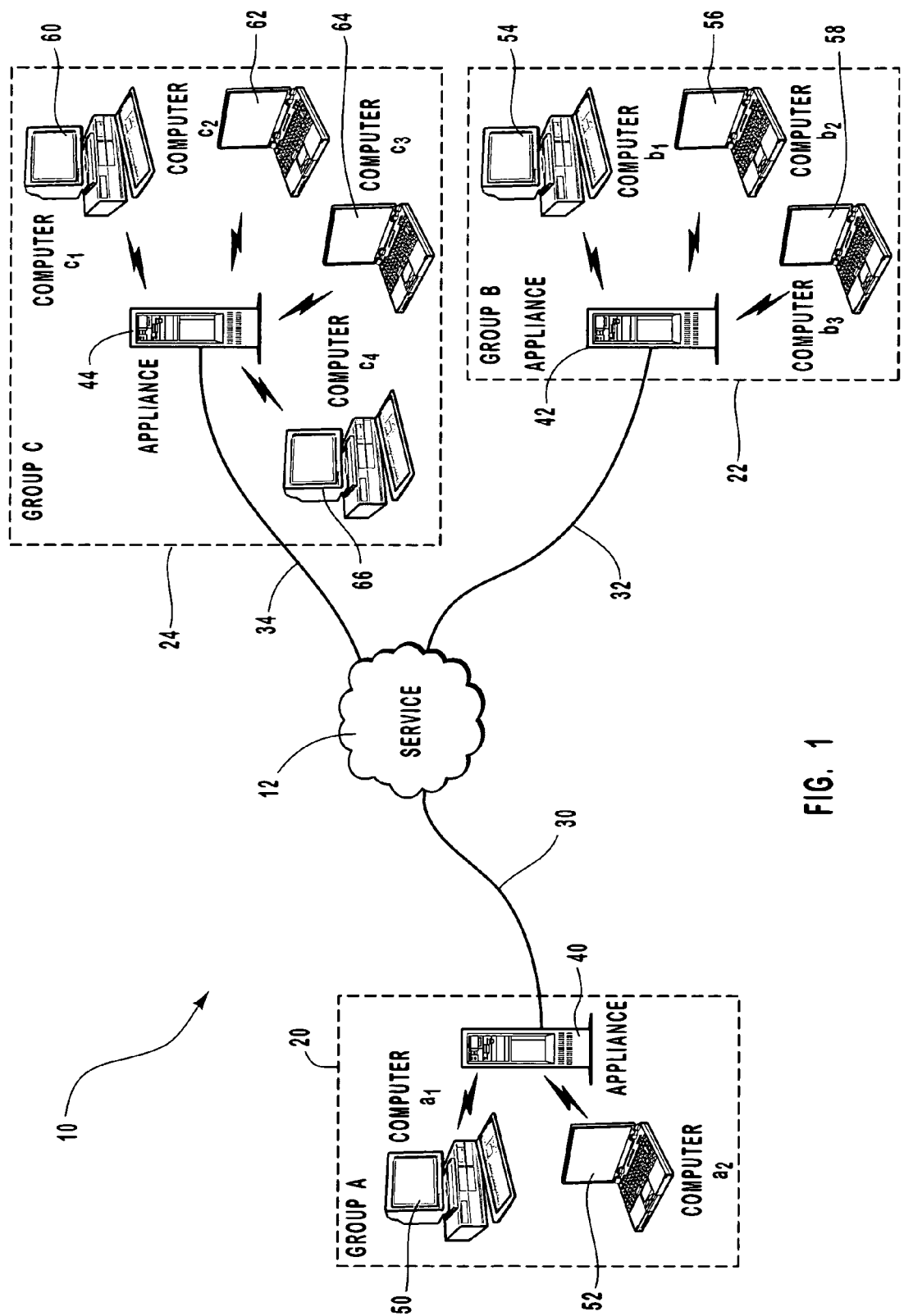
FIG. 1 illustrates a functional block diagram of a distributed networking environment configured to implement one embodiment of the present invention to enable the remote storage of data and or the sharing of data between remotely located computers.

Reference is next made to FIG. 1, which illustrates a functional block diagram of a distributed networking environment configured to implement a presently preferred embodiment of the present invention, designated generally at 10. The network environment 10 further includes a service 12 and three local computer groups A (20), B (22), and C (24). The service 12 utilizes a server or multiple servers having hardware and software that perform brokering services for data that is transferred between the various local groups A, B and C. Groups A, B and C are connected to the service 12 via connections 30, 32 and 34, which, in this embodiment are data pathways or segments of the Internet. The service 12 and each of the groups A, B and C are individually connected to the Internet via some form of access means that can include, but are not limited to a T1 line, DSL or other broadband access, dial-up modems, etc. Groups A, B and C can be substantially any local entities that implement a local network, such as home offices, small offices, home networks, individual computers, enterprise networks, etc.

Each of the groups A, B and C registers with the service in order to establish a valid data connection. The registration process further includes collecting information about a potential group, analyzing the information and, if the information meets a set of predetermined criteria, registering the group with the service 12. The service 12 is therefore networked with the registered groups A, B and C via the Internet in this embodiment. Alternatively, the service 12 can be connected to the groups A, B and C via some other form of large scale computer network, such as a metropolitan WAN or the like.

As shown in FIG. 1, groups A, B and C include appliance 40, 42 and 44, respectively. The appliances 40, 42 and 44 perform local brokering routines for all data transferred between the service 12 and any of the computers within the appliance's unique group. The appliance includes a computer device running a software module to perform the various local brokering routines. The appliances 40, 42 and 44 also provide an interface for communications with the service 12. As discussed above, the service interface in this embodiment can be any suitable hardware and software modules that facilitate a connection to the Internet. Alternatively, this service interface can include a network interface card (NIC) for connecting with a wide area network that provides the connection between the individual groups and the service 12.

The individual groups A, B and C further include at least one computer or device that is connected to the appliance. In this embodiment, the appliances 40, 42 and 44 are connected to the computers in their groups via a wireless interface. The use of wireless communication for the purpose of data transfer between appliances 40, 42 and 44 and other network components within the particular groups is often preferred, since wireless networks do not require specific types of wiring of the building in which the network is implemented. In other embodiments, however, communication between the appliances and the computers in the groups can be implemented using cables or other physical connections on which electrical or optical signals are transmitted between the network components using any suitable conventional protocol. The groups can have substantially any number of computers which, as used herein, should be broadly construed to extend to any computing device that can generate or use data that is to be transmitted to a remote appliance or computer for use or storage. While FIG. 4, which is discussed below, presents one example of a computer that can be used in any of the groups A, B or C, the computers can instead be hand-held devices, portable devices, Internet terminals or appliances, or other computing devices that generate data or have the need for storing data.

According to the example of FIG. 1, group A includes computers $a_1$ (50) and $a_2$ (52). Group B includes computers $b_1$ (54), $b_2$ (56) and $b_3$ (58). Group C includes computers $c_1$ (60), $c_2$ (62), $c_3$ (64) and $c_4$ (66). Both the computers in groups A, B and C and the appliances 40, 42 and 44 contain hardware and software modules to enable the exchange of data across the wireless interface, which can utilize, for example, the IEEE 802.11(a) or 802.11(b) standards. Alternatively, the wireless interface can utilize a Bluetooth or Ultra-Wide Band (UWB) format for data transfers. The computers and the appliance within each group thereby form a local wireless network. For example, in Group C, appliance 44 is connected with computers $c_1$, $c_2$, $c_3$ and c4. In addition, the computers and the appliance can also be connected via physical cabling. In this case, the wired connection scheme between the computers and the appliance conforms to a particular networking standard, such as Ethernet, Token Ring, USB, etc.

While the invention can be practiced in any of a number of network configurations, the appliances 40, 42 and 44, according to one embodiment of the invention, are computing devices that contain a hard drive to store data locally for the computers in their groups. The appliances 40, 42 and 44, according to this embodiment, provide redundant local data storage services for local computers within the groups of the appliances, as well as local data sharing and collaboration services for computers within the groups of the appliances. Because of the data storage capabilities of the appliances, the data that is stored remotely according to the invention can be stored directly on a remote appliance. Alternatively, the remote appliance can broker the transfer of the data to a computer within the remote appliance's group for storage thereon.

II. Request and Permission Procedures

Figure 2A:
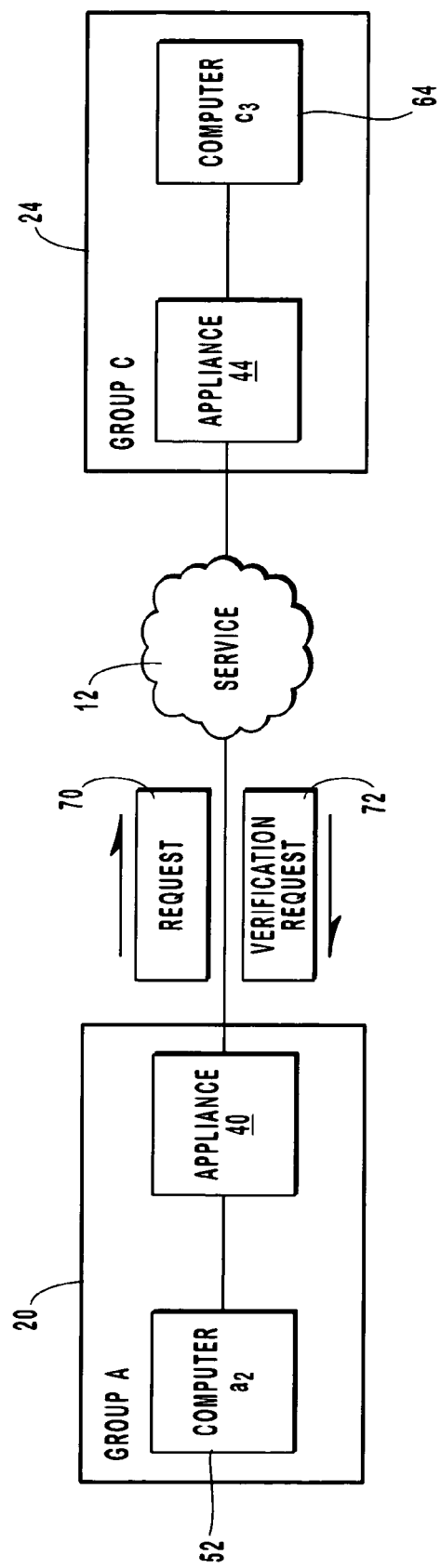
FIGS. 2a and 2b illustrate the request and permission procedures by which an initiating computer receives authorization to store data on a remote destination device.
Figure 2B:
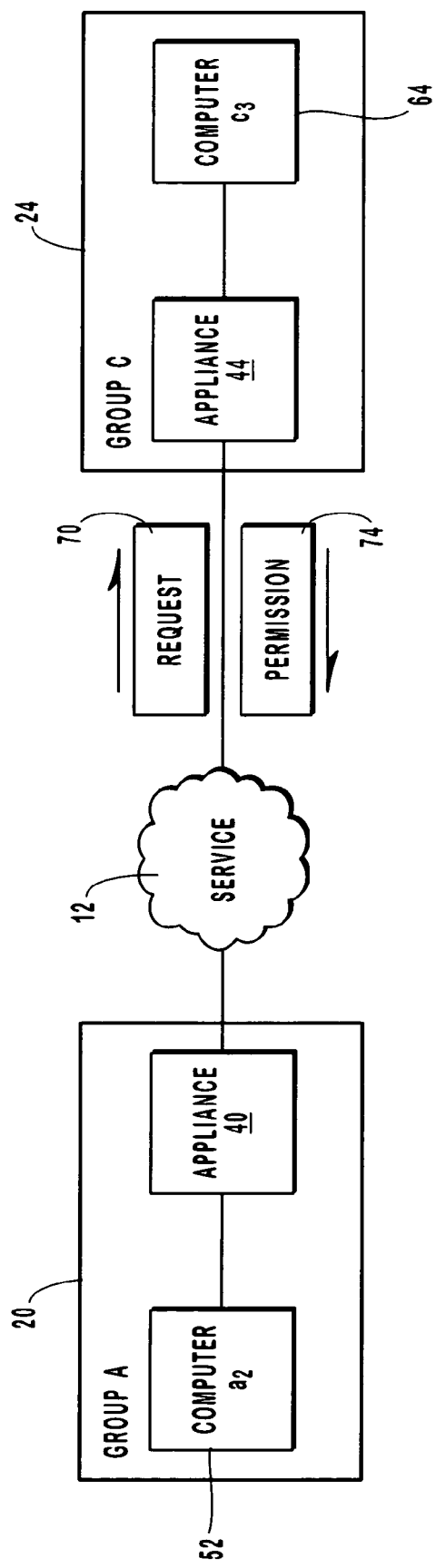

FIGS. 2a and 2b illustrate the method for establishing communication between computers or appliances in different groups and initiating data transfer between groups. In general, data is stored remotely only upon the initiating computer, which initiates the transfer of data to be stored remotely, being recognized by the destination device as being authorized to store the data remotely on the destination device. As used herein, the term "initiating computer" refers to the computing device that requests remote storage of its data on a remote destination device. The initiating computer can be an appliance, a computer associated with an appliance, or other computing devices. The "destination device" refers to the computing device that is targeted by the initiating device for remote storage of data. Likewise, the destination device can be an appliance, a computer associated with an appliance, or other computing devices. The remote storage of data, as explained in greater detail below, can be performed for remote backup or data collaboration purposes.

FIGS. 2a and 2b illustrate the request and permission procedures by which an initiating computer is permitted to initiate the remote storage of its data. The request and permission procedures ensure that the initiating computer stores the data on a remote computer only when the initiating computer is authorized to do so. This approach to remote storage of data enables peer-to-peer remote backup or data collaboration only when both parties give their consent to the transaction. Moreover, the use of this peer-to-peer model can make remote backup and data collaboration services accessible to substantially any computer user without the expenses associated with conventional remote data storage and networking systems, since both parties to the transaction are peers or, in other words, can be individual computer users, users in small or home offices, etc. Thus, in this manner, any two computer users who have access to the Internet can establish the peer-to-peer remote data storage and data collaboration system.

FIGS. 2a and 2b depict a portion of Groups A and C of FIG. 1. However, it is to be understood that the data transmission and remote storage methods of the invention can be performed between any two groups according to the invention. The request and permission procedure begins with an initiating computer which, in this example is computer $a_2$, identifying a remote device upon which to store data. The remote device must also be connected to and registered with the service. For example, computer $a_2$ of group A identifies appliance 44 of Group C for remote data storage. Thus, appliance 44 represents a destination device on which data from computer $a_2$ is to be remotely stored. The destination device can be any appliance or computer within a remote group that has data storage capabilities. In the following example, appliance 44 is the destination device, although other computing devices in group C or other remote groups having data storage capabilities can be the destination device. The identification of the destination device is performed by the user of computer $a_2$ identifying appliance 44 without viewing a list of computers that are connected to or registered with the service 12. This requirement ensures that the initiating computer that initiates the process of data transfer and remote storage has a certain level of familiarity with the destination device before requesting to remotely store data.

Alternatively, a modified list of available storage devices connected and registered with service 12 can be displayed on a user interface of the initiating computer $a_2$ to facilitate the identification of the destination device. In this alternative embodiment, the modified list is customized to the particular initiating computer to include only those computers that have previously accepted the role of being potential destination devices on which the initiating computer can store data. In either of these cases, the destination device (e.g., appliance 44) is operated by a user who is trusted by the user of the initiating computer $a_2$ to receive the data. Depending on the nature of those who are registered with the service, the user of destination device (e.g., appliance 44) could be a friend or family member, another acquaintance, a co-worker in the same business entity, or simply a person who has agreed to permit the user of initiating computer $a_2$ to remotely store data at the destination device. In the event of an appliance rather than a computer (e.g., computer $c_3$ of group C) being identified as a destination device, the user of the appliance who has consented to permit the appliance to be used for remote data storage purposes can be an appropriate user of one of the computers in the group (e.g., a user of computer $c_3$).

As shown in FIG. 2a, a request 70 is generated by computer $a_2$ (i.e., the initiating computer). The request includes information identifying the destination device (e.g., appliance 44), such as a network address of the destination device that is recognized by service 12. The request 70 is then brokered by the local appliance 40 associated with the initiating computer, which involves forwarding the request 70 to service 12. Service 12 can then broker the request 70 by forwarding the request to the remote appliance in the group that includes the destination device. Alternatively, prior to brokering the request 70, the service 12 can send a verification request 72 to the initiating computer $a_2$ asking the user of the initiating computer to verify that request 70 identifies the proper destination device.

The process of locally brokering data transmissions by the appliances 40 and 44 is performed by receiving data transmissions, such as request 70, from one of the connected computers $a_2$ and $c_3$, respectively, or from the service 12, and then identifying the destination of the request. If the destination of the request identifies a computer or device connected directly to the appliance, the appliance routes the request directly to the computer or device. If the destination identifies a computer or device not connected directly to the appliance, the appliance routes the request to the service 12. This brokering process is performed by a software module on a processing device located within the appliance. Likewise, the broad brokering process performed by the service 12 includes analyzing the destination of the request and then routing the request to the destination appliance.

As shown in FIG. 2b, service 12 forwards request 70 to the appliance 44 in the group that includes the destination device. As noted above, appliance 44 in this example is the destination device. In other implementations, however, the destination device can be a computer (e.g., computer $c_3$) that is connected to appliance 44. Once the request has been transmitted to appliance 44, a determination is made as to whether permission for the initiating computer $a_2$ to remotely store data should be granted in response to the request.

The decision as to whether the initiating computer $a_2$ is authorized to store data remotely on the destination device can be made in any of a variety of ways, depending on the information that is included in the request and the degree to which a human user is to make the decisions. For instance, the request can include information identifying the initiating computer, information identifying the destination device, and a password or other code. If the request includes a password or another code, the password or code can be used to verify that the user of the initiating computer has some personal knowledge of the destination device, which presumably has been given to the user of the initiating computer by an authorized user associated with the destination device. For instance, the password or code can be given by the user of the destination device to the user of the initiating computer so as to enable the initiating computer to generate a request for remote data storage services that can be automatically granted by the destination device. As used herein, the term "password" represents any information that is used to verify that the user of the initiating computer that has initiated the request has specific knowledge of the destination device that has been supplied by a user of the destination device.

Implementations using a password or other code in the request are particularly useful for enabling a user of a destination device to grant trusted third parties (i.e., trusted users of potential initiating computers) the ability to cause their data to be stored remotely on the destination device. In effect, the user of the destination device thereby enables trusted third parties to access the destination device for remote storage purposes, which can greatly simplify the process of obtaining remote storage of data, since substantially any computer users can participate in the services described herein without requiring elaborate networks and sophisticated knowledge of networking technology.

As noted above, the decision as to whether to grant permission can be made either manually or automatically based on the recognition of the presence of the password or other code in the request made by the initiating computer. Alternatively, the decision as to whether to grant the permission can be made based on the identification of the initiating computer or the identification of the user of the initiating computer, as specified in the request. This permission can also be granted either manually or automatically. Moreover, the permission can be granted for a single transaction or can be granted for a temporary or an indefinite amount of time, which permits the initiating computer to transmit multiple segments of data to the destination device over a period of time.

Assuming that a human user is to decide in the example of FIG. 2b whether to grant permission, the destination appliance 44, upon receiving request 70, brokers the request to a computer that is associated with a user who is authorized to grant permission in response to the request. This computer is referred to herein as the "destination computer" regardless of whether it or the associated appliance is the destination device that has been requested for the data storage. The receipt of a request at the destination computer causes the destination computer to prompt the user to grant or deny permission for the initiating computer to store data on the destination device. If the user of the destination computer decides to grant permission, the destination computer transfers data representing the permission back through the destination appliance 44, service 12, the initiating appliance 40 and, if necessary, to the initiating computer $a_2$. In this manner the initiating computer $a_2$ and/or the appliance 40 associated with the initiating computer receives the data representing the permission to store data on the destination device. The process by which the permission is transferred from the destination computer $c_3$ to the initiating computer $a_2$ is similar to the process by which the request is transferred from the initiating computer $a_2$ to the destination computer $c_3$. The initiating appliance 40 and destination appliance 44 perform the local brokering process described above, and the service 12 performs the broad brokering process described above.

III. Remote Data Storage

Figure 2C:
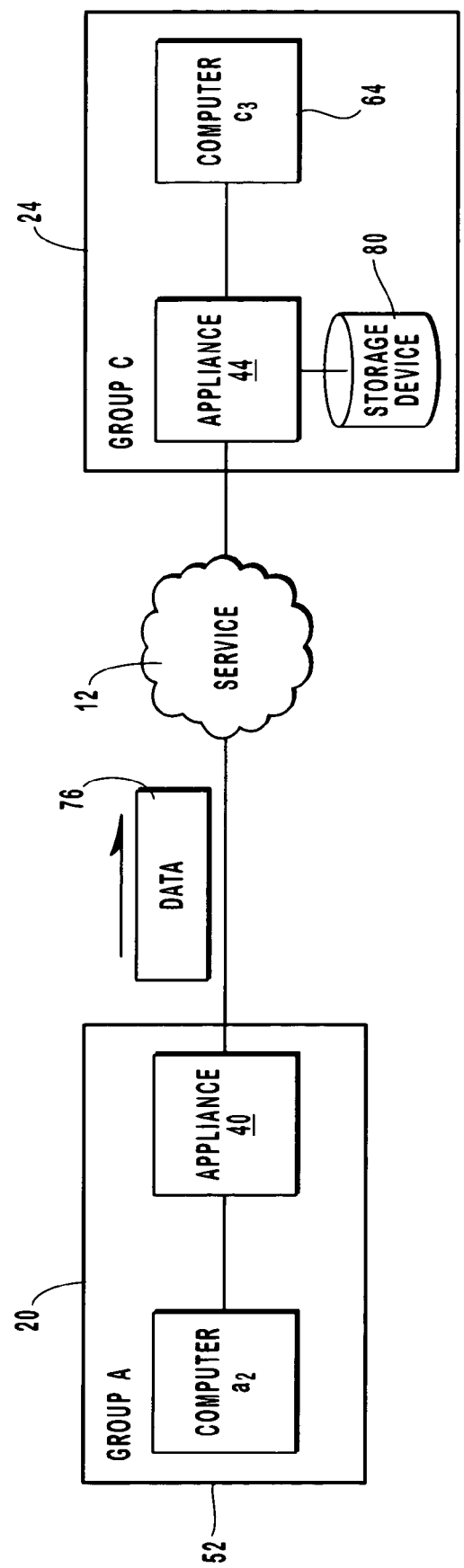
FIG. 2c illustrates a method of storing data remotely at the destination device for purposes of remote backup of the data after permission has been granted.

FIG. 2c illustrates the process of remotely storing data for backup purposes after permission has been granted as described above in reference to FIGS. 2a and 2b. After the permission is transferred from the destination computer $c_3$ back to the initiating computer $a_2$, the initiating computer transfers the segment of data 76 to the initiating appliance 40, such that the segment of data is brokered to the service 12, and then to the remote appliance 44. In this example, remote appliance 44 is itself the destination device. Thus, when remote appliance 44 receives the segment of data 76, the data has been transferred to the destination device for remote storage. In this case, the destination appliance 44 itself stores the data in storage device 80. Although the appliance 44 is designated as the destination device in this example, one of the computers, such as computer $c_3$, could instead be designated as the remote destination device.

When the data is stored for remote backup purposes, as in the example of FIG. 2c, the data is generally encrypted prior to transmission from the initiating computer with an encryption key that is not available to the user of the destination computer. Although the user of the destination computer is often a person who is trusted by the user of the initiating computer, the data is typically encrypted in this manner so as to further ensure the security of the backed up data. Nonetheless, while encryption provides clear and significant advantages when used with the remote backup of data, the invention also extends to implementations of the systems described herein that use other forms of encryption or none at all.

If the purpose of the remote storage of the segment of data 76 is to provide reliability or redundancy of the information contained within the segment of data, it is important to maintain a current copy of the segment of data on the initiating device so as to minimize the amount of data loss in the event one copy of the data is destroyed. Likewise, if the purpose of the remote storage of the segment of data is to perform online remote collaboration, as will be further discussed below in reference to FIG. 2d, it is important for each of the collaborators to see any changes made by the other collaborators as often as possible.

With a backup version of the segment of data 76 remotely stored in storage device 80, the initiating computer 76 can access the remotely stored version of the segment of data as needed. For instance, if the local copy of the segment of data 76 is corrupted or physically lost at the initiating computer, the remote copy thereof can be obtained from storage device 80 using a read request process that is brokered by the appliance 40, the service 12 and, if necessary, appliance 44.

IV. Remote Data Collaboration

Figure 2D:
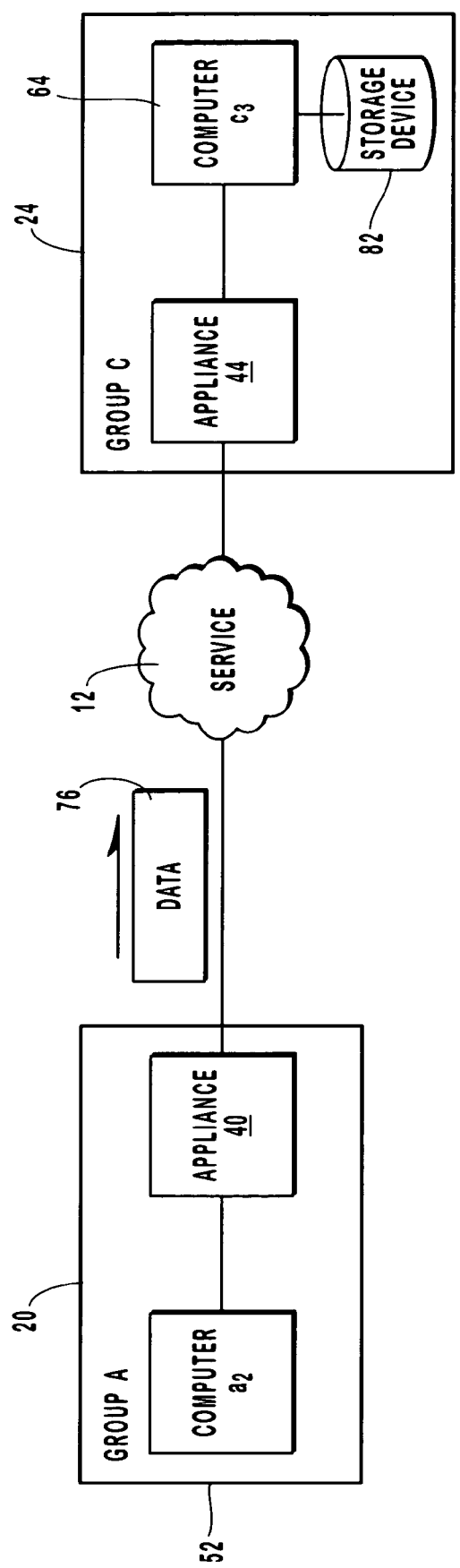
FIG. 2d illustrates a method of storing data remotely for purposes of remote data collaboration after permission has been granted.

FIG. 2d illustrates the process of transmitting data to a remote destination device for data collaboration purposes after permission has been granted as described above in reference to FIGS. 2a and 2b. After the permission is transferred from the destination computer $c_3$ back to the initiating computer $a_2$, the initiating computer transfers the segment of data 76 to the initiating appliance 40, such that the segment of data is brokered to the service 12, and then to the remote appliance 44. In this example, the destination device is computer $c_3$, in which case, remote appliance 44 brokers the transfer of the segment of data 76 to the destination device. The segment of data 76 is then stored in a storage device 82 associated with computer $c_3$. Storing the segment of data 76 on the storage device 82 of computer $c_3$ permits the user of computer $c_3$ to conveniently access the data and collaborate with the user of the initiating computer $a_2$. However, the segment of data 76 can alternatively be stored on a storage device associated with appliance 44, as shown in FIG. 2c, so as to enable multiple computers within group C to conveniently access the data.

The process of storing the segment of data 76 on storage device 82 can be performed in a manner such that the segment of data is dynamically updated at the destination device periodically as the segment of data is modified at the initiating computer $a_2$. Dynamically updating a segment of data includes periodically overwriting the existing segment of data by transferring a newer version thereof from the initiating computer $a_2$ to the destination device. This dynamic updating of the segment of data can be performed in the embodiment of FIG. 2c, in which the data is stored for backup purposes, or in the embodiment of FIG. 2d, in which the data is stored for collaboration purposes.

In addition, lock out features can be included on the remote copies of the segment of data 76 to avoid collisions during online or remote collaboration. A collision occurs when more than one participant in a collaboration modifies a duplicate document at the same time and then both versions of the document are copied to all of the participants. It is preferable to lock all copies of a document while one participant is modifying the document and then releasing the document when he or she is complete. Alternatively, a document merging system can be generated which would allow multiple participants to create different versions of the same document. The document merging system would then merge the modifications made by all of the participants into a unified document.

The segment of data remotely stored on the destination device is dynamically updated or overwritten in response to predetermined criteria. The predetermined criteria can be, for example, a rule that specifies that the remotely stored segment of data is to be automatically updated after a certain period of time has elapsed without updating. Alternately, the predetermined criteria can be a rule specifying that the remotely stored segment of data is to be updated in response to a particular event, such as an update request by a user of the initiating computer. The process by which the segment of data is automatically transferred from the initiating computer to the destination computer is similar to the process by which the request is transferred.

When data is stored remotely in order to facilitate remote collaboration between multiple users, the data is to be accessible by all of the authorized users in an unencrypted state. However, in the collaboration implementation of the invention, encryption can be used during data transmission using, for example, a private key/public key encryption technique that prevents unauthorized persons from accessing the data. These or other encryption techniques that will be understood by those of skill in the relevant art upon learning of the disclosure made herein can be used for the transmission of the data itself as well as the transmission of the request and permission.

When the segment of data 76 is received by the destination device for collaboration purposes, the destination device can modify the segment of data as instructed by the user of the destination device. In this manner, the destination device generates a modified version of the segment of data, which can be transmitted back to the initiating device via the appliances and the service. Moreover, the data collaboration techniques of the invention can be scaled for use with more than two computers and more than two groups and their associated appliances. Using the techniques described herein, substantially any set of computer users having access to the Internet can establish a virtual local area network in an inexpensive and convenient manner so as to achieve remote data collaboration or data storage.

V. Data Brokering and Data Transmission Features of Appliances

According to one embodiment of the invention, and as described above in reference to FIG. 1, appliances 40, 42 and 44 of FIG. 1 are computing devices having mass data storage capabilities that provide the local services of data storage and data collaboration and sharing among computers within the groups of the appliances. These appliances enable computer users in large or small enterprises, home office, small offices, and home networks, to conveniently back up data locally and share data between computers in the local network. In effect, FIG. 1 illustrates a distributed network of multiple groups A, B and C, each having its own appliance 40, 42 and 44, with communication between the groups being facilitated and brokered by service 12. Thus, the registration of multiple appliances 40, 42 and 44 with service 12 expands the utility of the individual appliances. In particular, the multiple distributed appliances 40, 42 and 44 enables users of computers with the local groups to utilize remote appliances for backup and data collaboration purposes. Moreover, the multiple appliances 40, 42 and 44 provide the advantages of the remote data backup and remote data collaboration, thereby providing inexpensive, easily accessible network services to substantially any computer user who obtains an appliance 40, 42 or 44 and is able to connect to the Internet.

One benefit of using appliances 40, 42 and 44 for facilitating the transfer of data is that the appliances can be specialized devices that can more efficiently perform the data storage and data transmission than a general purpose personal computer. For instance, appliances 40, 42 and 44 can have significantly large hard drives, which permit them to manage data for a large number of associated computers in their group, as well as for remote computers according to the techniques described herein. In addition, because the Internet connections used by, for example, appliance 40 of group A and appliance 44 of group C can have different data transmission rates, the appliances can be used to buffer the data transfer between groups so as to appear seamless from the perspective of the associated computers in the groups. In many instances, especially for backup applications of the invention, the data transfer rate does not need to be particularly high. Thus, if a local appliance 40 has a connection to the service 12 having a high data transmission rate, while the remote appliance 44 has a slower connection to service 12, the local appliance can buffer the data or otherwise introduce latency to the data transmission so as to make it compatible with the slower connection of the remote appliance 44. Alternatively, service 12 can compensate for the slower connection to remote appliance 44 in a similar manner.

VI. Alternative Network Architectures

Figure 3:
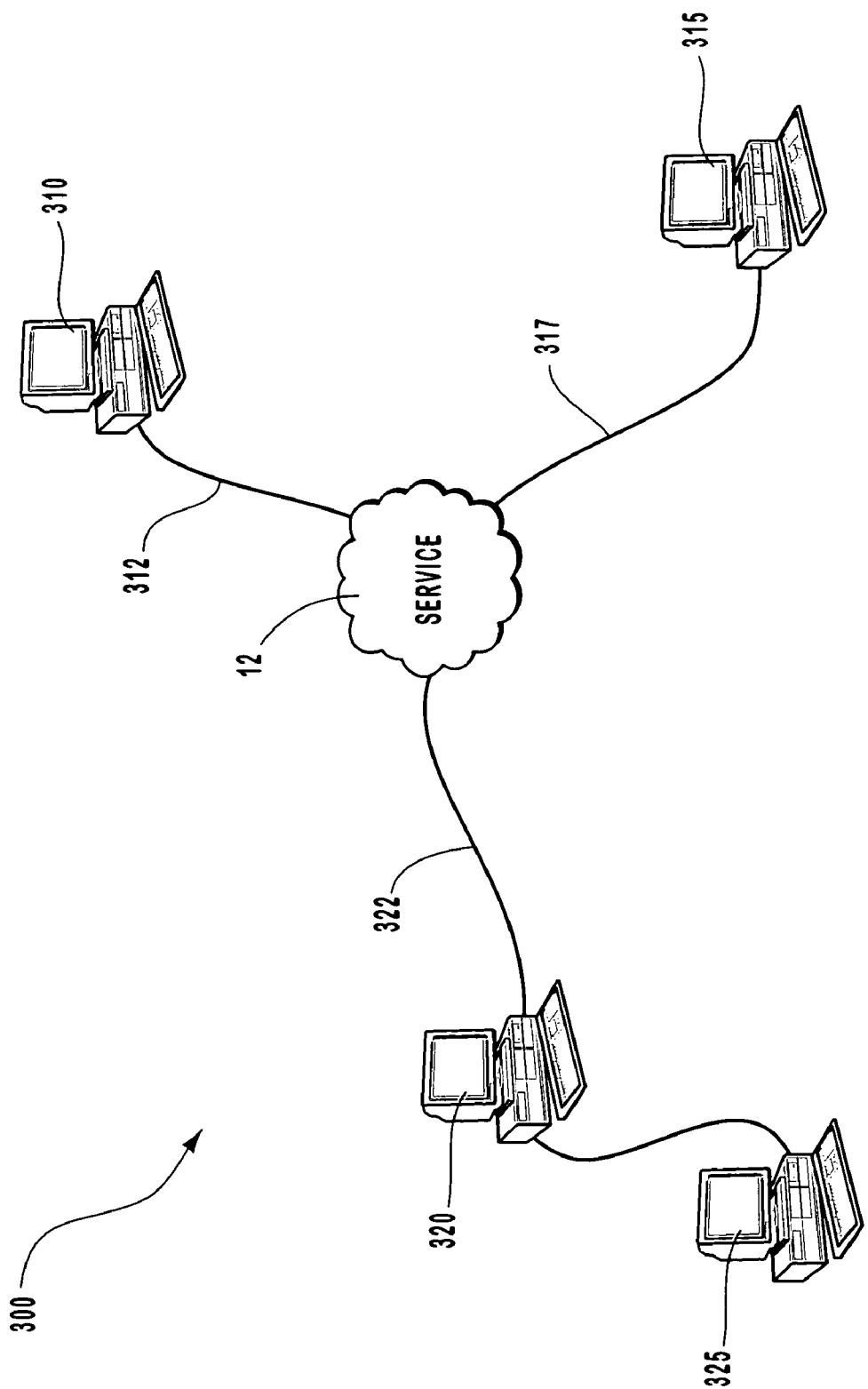
FIG. 3 illustrates a functional block diagram of an alternative networking environment configured to implement an alternative embodiment of the present invention to enable the remote storage of data and or the sharing of data between remotely located computers.

Reference is next made to FIG. 3, which illustrates a functional block diagram of a networking environment configured to implement an alternative embodiment of the present invention, designated generally at 300. According to this alternative embodiment, the appliances 40, 42 and 44 of FIG. 1 are either not present, or the functionality of the appliances as described above is performed by a general purpose computer. The networking environment 300 includes a service 12 and a plurality of computers or devices connected to the service. The service 12 and its functions are described in more detail with reference to FIG. 1. The individual computers 310, 315, 320, 325 are connected to the service directly or indirectly via connectors 312, 317, 322. Each of the computers 310, 315, 320, 325 must be registered with the service in order to establish a valid data connection over the Internet. The registration process further includes collecting information about a new computer, analyzing the information, and if the information meets a set of predetermined criteria, registering the computer with the service 12. In this embodiment, the connectors 312, 317, 322 represent portions of the Internet allowing for data communication between each of the computers 310, 315, 320, 325 and the service 12. Rather than a direct connection to the Internet, computer 325 is connected to computer 320 via a networking connection. This type of connection allows computer 320 to access the Internet and service 12 despite not being directly connected to the Internet or service 12.

With continued reference to FIG. 3, a method by which an individual computer can store data on a remotely located computer can be implemented in the illustrated environment. The method used to remotely store data in this environment is substantially the same as the method employed to remotely store data described in reference to FIGS. 1 and 2*a*-2*d*. One difference, however, is the lack of appliances in the embodiment illustrated in FIG. 3. Therefore, all transfers of data between remote computers are made directly to service 12, which then brokers them to the proper remote computer. This process eliminates the need for some of the local brokering performed by the appliances in the method described in reference to FIGS. 1 and 2*a*-2*d*. The local brokering procedures can be incorporated into the software modules within the individual computers 310, 315, 320, 325, such as in the case of computer 320 brokering all communication to and from computer 325. Alternatively, the need for local brokering can be completely eliminated by directly connecting each of the computers 310, 315, 320, 325 to the service 12.

The following discussion provides an additional general description of examples of suitable computing environments in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer network enabling the remote storage of data, comprising:
    a plurality of computers, wherein a requesting computer in a first group of the plurality of computers is remotely located from a remote computer in a second group of the plurality of computers, wherein the remote computer is identified by the requesting computer as a particular location for storage of data;
    a plurality of appliances, wherein each appliance is operably connected to a respective group of the plurality of computers and acts as a local broker for the respective group of the plurality of computers; and
    a service that is operably connected via the computer network to the plurality of appliances, wherein the service is configured to
        broker requests from the requesting computer transmitted via a respective one of the plurality of appliances to store data of the requesting computer on the remote computer; and
        broker data transmissions in which the data is transferred from the requesting computer to the remote computer.

2. The computer network of claim 1, wherein at least one of the plurality of appliances has a wireless connection with one or more local computers of the plurality of computers so as to form a local group.

3. The computer network of claim 2, wherein the at least one of the plurality of appliances is operably connected to the service via a wired connection.

4. The computer network of claim 1, wherein the each of the plurality of computers includes a software module that is configured to provide an interface between each of the plurality of computers and an associated one of the plurality of appliances.

5. The computer network of claim 1, wherein the service brokers requests from the requesting computer to store data of the requesting computer on the remote computer by:
    receiving a request from the requesting computer for permission to store a segment of the data at the remote computer, the request identifying the remote computer;
    transmitting the request to the remote computer; and
    receiving data representing the permission from the remote computer, the data representing the permission indicating that the remote computer has granted the permission.

6. The computer network of claim 5, wherein the service brokers data transmissions in which the data is transferred from the requesting computer to the remote computer by:
    receiving the segment of data from the requesting computer; and
    transmitting the segment of the data to the remote computer for storage thereon only after receiving the data representing the permission.

7. The computer network of claim 1, wherein the data is encrypted before the data is transferred from the requesting computer to the remote computer, such that the data is inaccessible by a user of the remote computer.

8. The computer network of claim 1, wherein:
    the data represents a backup version of specified data; and
    the computer network permits the requesting computer to access the backup version of the specified data after the backup version has been transferred from the requesting computer to the remote computer.

9. The computer network of claim 1, wherein:
    the service transfers data between the requesting computer and the remote computer so as to permit data collaboration between users of the requesting computer and the remote computer; and
    wherein data collaboration includes the service transmitting a modified version of the data from the remote computer to the requesting computer.

10. The computer network of claim 1, wherein the service further:
    brokers requests from the remote computer to store data of the remote computer at the requesting computer; and
    brokers data transmissions in which data is transferred from the remote computer to the requesting computer.

* * * * *